United States Patent
Bocchieri et al.

(10) Patent No.: US 8,914,510 B2
(45) Date of Patent: Dec. 16, 2014

(54) METHODS, SYSTEMS, AND COMPUTER PROGRAM PRODUCTS FOR ENHANCING INTERNET SECURITY FOR NETWORK SUBSCRIBERS

(75) Inventors: Enrico Bocchieri, Chatham, NJ (US); Horst Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 636 days.

(21) Appl. No.: 12/272,202

(22) Filed: Nov. 17, 2008

(65) Prior Publication Data

US 2010/0125668 A1 May 20, 2010

(51) Int. Cl.
*G06F 15/16* (2006.01)
*G06F 15/173* (2006.01)
*G06F 11/00* (2006.01)
*H04L 29/08* (2006.01)

(52) U.S. Cl.
CPC ............ *H04L 67/22* (2013.01); *H04L 67/146* (2013.01); *H04L 67/142* (2013.01); *H04L 67/14* (2013.01)
USPC .................. 709/226; 709/228; 726/9; 726/26

(58) Field of Classification Search
CPC ............ H04L 29/08621; H04L 67/146; G06F 21/6263; H04N 2201/3207; H04N 21/2265; H04N 21/222
USPC ................................ 709/226, 228, 26; 726/9
See application file for complete search history.

(56) References Cited

U.S. PATENT DOCUMENTS

2001/0056476 A1* 12/2001 Benayoun et al. ............ 709/218
2005/0015429 A1* 1/2005 Ashley et al. ................. 709/200
2009/0199285 A1* 8/2009 Agarwal et al. ................... 726/9

OTHER PUBLICATIONS

Parameswaran, R.; Blough, D.M., "Privacy Preserving Collaborative Filtering Using Data Obfuscation," Granular Computing, 2007. GRC 2007. IEEE International Conference on , vol., No., pp. 380,380, Nov. 2-4, 2007.*
Canny, John, "Collaborative filtering with privacy," Security and Privacy, 2002. Proceedings. 2002 IEEE Symposium on , vol., No., pp. 45,57, 2002.*

(Continued)

*Primary Examiner* — Taylor Elfervig
(74) *Attorney, Agent, or Firm* — Myers Bigel Sibley & Sajovec, P.A.

(57) ABSTRACT

A network communication system includes a connection server that assigns a network address within a data communication network to a subscriber terminal. The connection server receives outgoing communications from the subscriber terminal and transmits the outgoing communications to a network access point and receives incoming communications from the network access point and transmits the incoming communications to the subscriber terminal. The connection server intercepts a tracking cookie received from a remote server in the data communications network and intended for the subscriber terminal and stores the tracking cookie at the connection server so that the tracking cookie can be used to support a communication session between the subscriber terminal and the remote server without the tracking cookie being stored at the subscriber terminal.

18 Claims, 5 Drawing Sheets

(56) References Cited

OTHER PUBLICATIONS

Chuan Yue; Mengjun Xie; Haining Wang, "Automatic Cookie Usage Setting with CookiePicker," Dependable Systems and Networks, 2007. DSN '07. 37th Annual IEEE/IFIP International Conference on , vol., No., pp. 460,470, Jun. 25-28, 2007.*

Patel, V.; Juric, Radmila, "Internet users and online privacy: a study assessing whether Internet users' privacy is adequately protected," Information Technology Interfaces, 2001. ITI 2001. Proceedings of the 23rd International Conference on , vol., No., pp. 193,200 vol. 1, Jun. 19-22, 2001.*

"HTTP cookie," http://en.wikipedia.org/wiki/HTTP_coo . . . , From Wikipedia, Printed from the Internet Sep. 3, 2008, 16 pages, Admitted Prior Art.

"Proxy server," http://en.wikipedia.org/wiki/Proxy_ser . . . , From Wikipedia, Printed from the Internet Sep. 3, 2008, 7 pages, Admitted Prior Art.

Tyson, Jeff, "How Internet Infrastructure Works," http://computer.howstuffworks.com/internet-infrastructure/htm/printable, 4 pages, Printed from the Internet Oct. 1, 2008, Admitted Prior Art.

"How Anonymizers Work," http://www.livinginternet.com/i/is_anon_work.htm, Printed from the Internet Aug. 24, 2008, 3 pages, Admitted Prior Art.

Boyan, Justin, "The Anonymizer, Protecting User Privacy on the Web," Printed from the Internet Sep. 3, 2008, 7 pages, Admitted Priori Art.

* cited by examiner

METHODS, SYSTEMS, AND COMPUTER PROGRAM PRODUCTS FOR ENHANCING INTERNET SECURITY FOR NETWORK SUBSCRIBERS

BACKGROUND

The present disclosure relates to communications networks, and, more particularly, to enhancing the security and/or privacy of network communications for subscribers to a network service.

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages, applications and/or files reside, as well as clients (Web browsers), which interface users with the remote servers. Specifically, Web browsers and software applications send a request over the WWW to a server, requesting a Web page identified by a Uniform Resource Locator (URL), which notes both the server where the Web page resides and the file or files on that server which make up the Web page. The request includes the IP address of the client. The server then sends a copy of the requested file(s) to the IP address associated with the client, and the Web browser at the client terminal displays the Web page to the user. Other types of interaction are possible. For example, a file can be requested from a remote file server, data can be requested from an application on a remote server, etc. In any such exchange, the remote server must be supplied with an address to which the response should be sent.

The topology of the World Wide Web can be described as a network of networks, with providers of network services called Network Service Providers, or NSPs, or Internet Service Providers (ISPs). Servers that provide application-layer services may be referred to as Application Service Providers (ASPs). Sometimes a single service provider provides both functions.

Considering the public accessibility of the Web, individuals, groups, and organizations may be concerned with privacy and the protection of sensitive and/or private information. As such, reasonable protections may be used when transmitting such information over the Web. Yet, in some cases these protections may fail, and sensitive information may be undesirably stolen, lost, or otherwise disseminated so as to be obtainable by unauthorized third parties. Furthermore, it is often the case that a user does not know who is operating the server with which the terminal is communicating. For example, a user seeking to download a particular file could be redirected, via a hyperlink, to a server that is unaffiliated with the site the user was visiting. In some cases, a malicious web server may attempt to download a virus, or other malicious software to the user's terminal.

One aspect of WWW communications is that such communications are "stateless," in that each request from a terminal at an IP address to a server is treated as a separate request that is independent of other requests from the same IP address. This simplifies server design because the server does not need to dynamically allocate storage to deal with conversations in progress or worry about freeing it if a client dies in mid-transaction. However, because the connection is stateless, it may be necessary to include more information in each request. Furthermore, some types of transactions are difficult to conduct in a stateless environment. For example, online shopping requires the server to be able to keep track of a customer's state from one request to the next, so that the server can keep track of items in the customer's shopping cart, whether the customer has checked out yet, what billing information is to be used, etc.

In order to provide state information for a WWW transaction, WWW protocols provide for the use of "cookies," which are strings of data that are stored at the client terminal. A WWW server can place a cookie on a client terminal. The server keeps track of the contents of the cookie and the IP address at which it was stored. When a request is sent to the server, the cookie is sent, unchanged, to the server along with the request. The server can thereby associate the request with a session, and provide an appropriate response to the request.

Accordingly, cookies can be used for a number of purposes, including authentication, session tracking (state maintenance), and maintaining specific information about users, such as site preferences or the contents of their electronic shopping carts. Moreover, some websites are designed to be highly interactive, and can only be accessed with full functionality if the client is configured to accept cookies.

Cookies can also be used as a means of tracking user behavior. For example, a server can keep track of a user's activities by recording them and associating them with a cookie stored on the user's terminal. By aggregating information over time, a server can build a profile of the user, or at least of the behavior of those users that use a particular terminal. In many cases, this information can be used for the benefit of the user, by permitting the server to provide customized services or offers to the user. However, this information can also be used maliciously, and can in some cases be viewed as an invasion of privacy. In any case, many users simply do not wish to have possibly unknown third parties collecting information about them over the Internet.

Furthermore, many times, the associations of WWW behavior with a particular IP address is erroneous, as the IP address of a terminal can change over time. For example, ISPs have a pool of IP addresses that can be dynamically assigned to terminals. A subscriber who has a laptop computer can be assigned one IP address when connecting to their ISP at home and another IP address when connecting at a remote location. Thus, when associations are based on IP addresses, servers can inadvertently associate browsing behavior of one subscriber with another.

While cookies may only be sent to the server that set them, or one in the same Internet domain, a Web page may contain images or other components stored on servers in other domains. Cookies that are set during retrieval of these components are called third-party cookies. Third party cookies may be particularly troublesome for some users, as they can be used to track the actions of a user across many different servers.

SUMMARY

A network communication system according to some embodiments includes a first interface configured to establish a communication path with a subscriber terminal, a second interface configured to establish a communication path with a network access point that is connected to a data communication network, and a connection server that is configured to assign a network address within the data communication network to the subscriber terminal. The connection server is configured to receive outgoing communications from the subscriber terminal and to transmit the outgoing communications to the network access point and to receive incoming communications from the network access point and transmit the incoming communications to the subscriber terminal. The connection server is further configured to intercept a tracking cookie received from a remote server in the data communications network and intended for the subscriber terminal and to store the tracking cookie at the connection server so that the tracking cookie can be used to support a communication session between the subscriber terminal and the remote server without the tracking cookie being stored at the subscriber terminal.

The connection server may be further configured to delete the tracking cookie after a predetermined period of time.

The connection server may be further configured to release the network address assigned to the subscriber terminal upon the occurrence of a predetermined event, and to delete the tracking cookie in response to the release of the network address assigned to the subscriber terminal.

The connection server may be further configured to release the network address assigned to the subscriber terminal upon the occurrence of a predetermined event, and to save the tracking cookie in response to the release of the network address assigned to the subscriber terminal for later use by the subscriber terminal when a new network address is assigned to the subscriber terminal.

The connection server may be further configured to intercept a request for the stored tracking cookie from the remote server and to provide the stored tracking cookie to the remote server in response to the request.

The connection server may be further configured to provide a notice to the subscriber terminal of the receipt and storage of the tracking cookie and to transmit the tracking cookie to the subscriber terminal in response to a request for the tracking cookie from the subscriber terminal.

The connection server may be further configured to replace the network address of the subscriber terminal in the outgoing communication with an alias network address. The connection server may be further configured to inspect an outgoing communication of the subscriber terminal to determine an identity of the remote server to which the outgoing communication is addressed and, in response to determining the identity of the remote server, to query the subscriber terminal to determine if the connection server should intercept cookies from the remote server.

The connection server may be further configured to determine that the remote server is associated with malicious use of tracking cookies and/or with identity theft.

The connection server may be further configured to intercept and reject third party cookies originating from servers other than the remote server and addressed to the subscriber terminal.

The connection server may be further configured to receive an outgoing communication from the subscriber terminal, to determine that the outgoing communication is addressed to the remote server, to insert the tracking cookie into the outgoing communication, and to forward the outgoing communication to the remote server.

Methods of providing network communication services according to some embodiments include establishing a communication path with a subscriber terminal, establishing a communication path with a network access point that is connected to a data communication network, and assigning a network address within the data communication network to the subscriber terminal. The methods further include intercepting a tracking cookie received from a remote server in the data communications network and intended for the subscriber terminal, and storing the tracking cookie so that the tracking cookie can be used to support a communication session between the subscriber terminal and the remote server without the tracking cookie being stored at the subscriber terminal.

The methods may further include deleting the tracking cookie after a predetermined period of time.

The methods may further include releasing the network address assigned to the subscriber terminal upon the occurrence of a predetermined event, and deleting the tracking cookie in response to the release of the network address assigned to the subscriber terminal.

The methods may further include releasing the network address assigned to the subscriber terminal upon the occurrence of a predetermined event, and saving the tracking cookie in response to the release of the network address assigned to the subscriber terminal for later use by the subscriber terminal when a new network address is assigned to the subscriber terminal.

The methods may further include intercepting a request for the stored tracking cookie from the remote server, and providing the stored tracking cookie to the remote server in response to the request.

The methods may further include receiving an outgoing communication from the subscriber terminal, determining that the outgoing communication is addressed to the remote server, inserting the tracking cookie into the outgoing communication, and forwarding the outgoing communication to the remote server.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION

Figure 1:
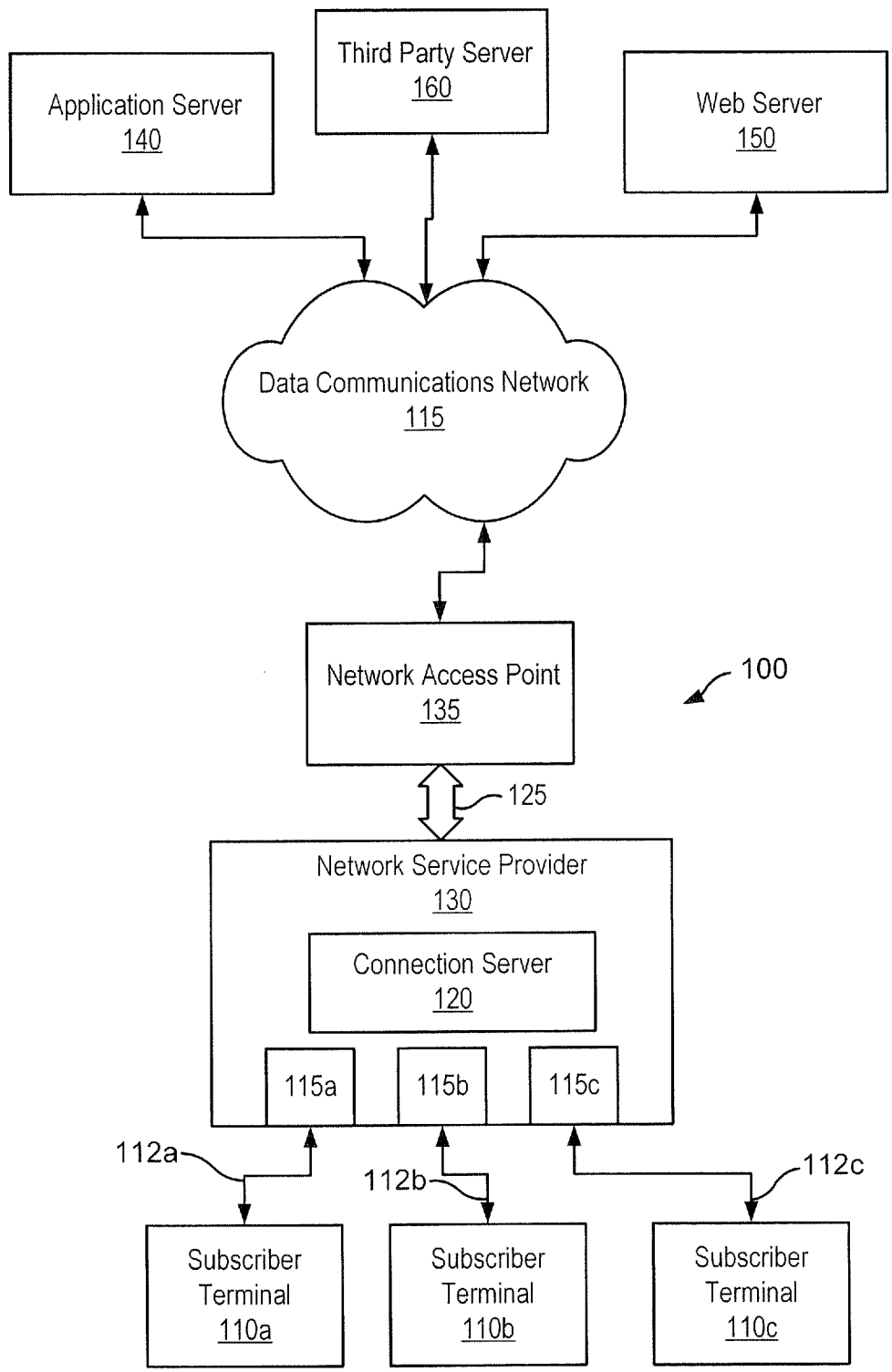
FIG. 1 is a block diagram that illustrates a system for enhancing network security for subscribers in accordance with some embodiments.

Exemplary embodiments now will be described more fully hereinafter with reference to the accompanying figures. It should be appreciated, however, that there may be additional embodiments in many alternate forms, and this disclosure should not be construed as limited to the embodiments set forth herein.

While the embodiments described herein are susceptible to various modifications and alternative forms, these exemplary embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. As used herein, the term "and/or" includes any and all combinations of one or more of the associated listed items.

Referring now to FIG. 1, an exemplary network architecture 100 for enhancing network security for network subscribers, in accordance with some embodiments, comprises a connection server 120 that is operated by a network service provider (NSP) 130. The NSP 130 provides access to a data communications network 115. The data communications network 115 may operate using a communications protocol such as TCP/IP, and may, for example, be the Internet. It will be appreciated, however, that the data communications network 115 can include any public and/or data communications network, and can operate using any communication protocol. The plurality of subscriber terminals 110a, 110b, and 110c (collectively referred to as subscriber terminal 100) are connected to a communications network 115 via the connection server 120. The network 115 may represent a global network, such as the Internet, or other publicly accessible network. The network 115 may also, however, represent a wide area network, a local area network, an Intranet, or other private network, which may not be accessible by the general public. Furthermore, the network 115 may represent a combination of one or more wired and/or wireless public and/or private networks and/or virtual private networks (VPN). In case the subscriber terminal 110 is a mobile phone, the identity of the subscriber is maintained by the network service provider 130 with the help of a Subscriber Identity Module (SIM) via a 20 digit ICC-ID, while the identity of the terminal 110 itself is maintained by the terminal device International Mobile Equipment Identity (IMEI) number.

The connection server 120 may be embodied as one or more enterprise, application, personal, pervasive and/or embedded computing devices that may be interconnected by a wired and/or wireless local and/or wide area network, including the Internet. In some embodiments, the connection server 120 may be situated in a secure location, such as the central office of a communications services provider, such as the NSP 130. Although FIG. 1 illustrates an exemplary communications network, it will be understood that the present invention is not limited to such configurations, but is intended to encompass any configuration capable of carrying out the operations described herein.

The connection server 120 provides network connection services for the subscriber terminals 110a, 110b and 110c. In particular, the connection server 120 acts as a gateway between the subscriber terminals 110a, 110b and 110c and a network access point 135 that is utilized by the NSP 130 to access the data communications network 115. The NSP 130 connects to the network access point 135 through a high-speed data interface 125. In some embodiments, the network access point 135 may be part of and/or controlled by the NSP 130.

Each of the subscriber terminals 110a, 110b and 110c connects to the NSP 130 via a respective communication link 112a, 112b and 112c (collectively referred to as communication link 112), that may include, for example, a cable, DSL, dial-up and/or wireless connection, via respective interface units 115a, 115b and 115c. Although three subscriber terminals, three communication links, and three interface units are shown for illustrative purposes, it should be appreciated that there may be any number of subscriber terminals, respective communication links, and respective interface units. The connection server 120 can be configured to dynamically provide network addresses to the subscriber terminals 110a, 110b and 110c. For example, the connection server 120 may be assigned a group or pool of network addresses that can be assigned to subscriber terminals 110a, 110b and 110c, and that permit the subscriber terminals 110a, 110b and 110c to communicate over the data communications network 115. Network addresses can be leased to the subscriber terminals 110a, 110b and 110c for a limited time duration. Furthermore, network addresses can be released by the connection server upon the occurrence of certain events, such as the disconnection of the subscriber terminals 110a, 110b and 110c.

According to some embodiments, data communications from the subscriber terminals 110a, 110b and 110c to and/or from destinations within the data communications network 115 pass through the connection server 120. The connection server 120 monitors communications to/from the subscriber terminals 110a, 110b and 110c and performs certain actions to enhance the security of communications by the subscriber terminals 110a, 110b and 110c, as described in more detail below.

The subscriber terminals 110a, 110b and 110c may establish communications with remote servers, such as an application server 140 and/or a web server 150, through the data communication network 115. A third party server 160 is also illustrated in FIG. 1. The third party server 160 represents other networked servers with which the subscriber terminals 110a, 110b and 110c do not establish a communication link. The communications between the subscriber terminals 110a, 110b and 110c and the remote server 140, 150, may be organized as client/server communications and/or as peer-to-peer communications.

Figure 2:
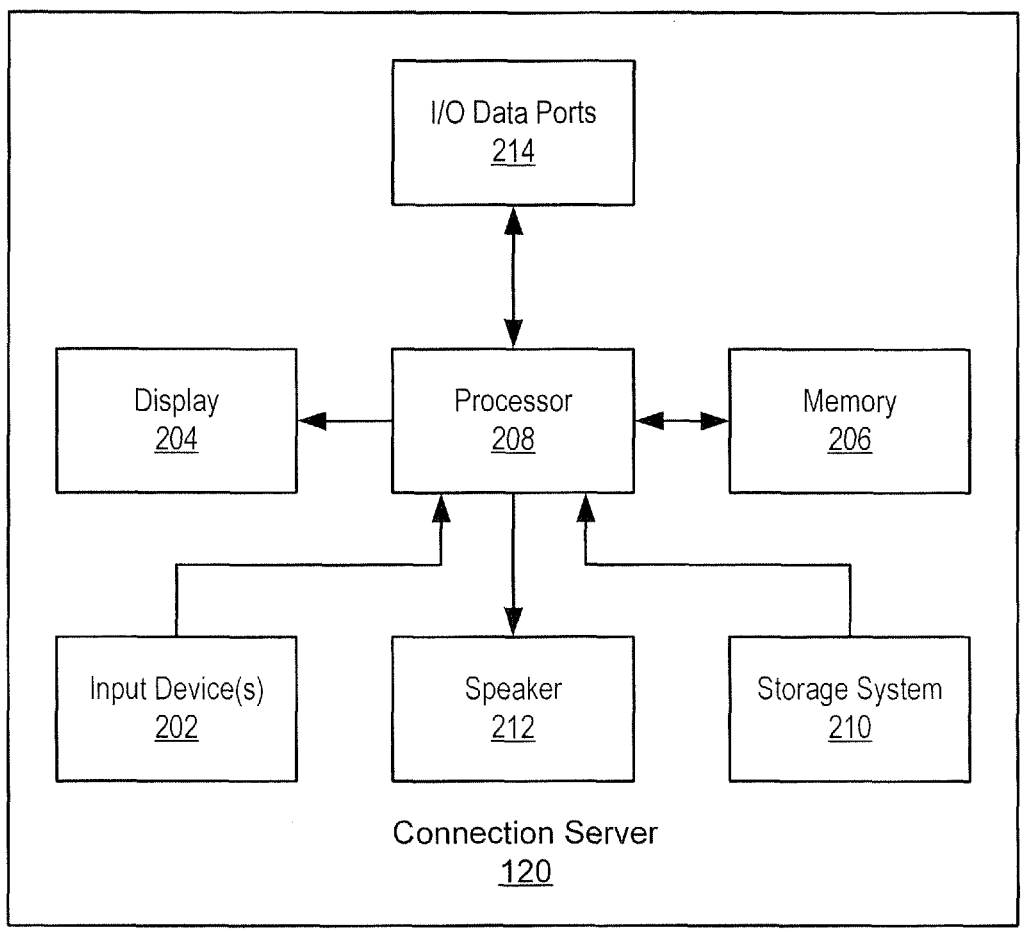
FIG. 2 illustrates a data processing system that may be used to implement a system for enhancing network security for subscribers in accordance with some embodiments.

Referring now to FIG. 2, a system that may be used to implement the connection server 120 of FIG. 1, in accordance with some embodiments, comprises input device(s) 202, such as a keyboard or keypad, a display 204, and a memory 206 that communicates with a processor 208. The data processing system 200 may further include a data storage system 210, a speaker 212, and an input/output (I/O) data port(s) 214 that also communicate with the processor 208. The data storage system 210 may include removable and/or fixed media, such as floppy disks, ZIP drives, hard disks, or the like, as well as virtual storage, such as a RAMDISK. The I/O data port(s) 214 may be used to transfer information to/from another computer system or a network (e.g., the Internet). These components may be conventional components such as those used in many conventional computing devices, which may be configured to operate as described herein.

Figure 3:
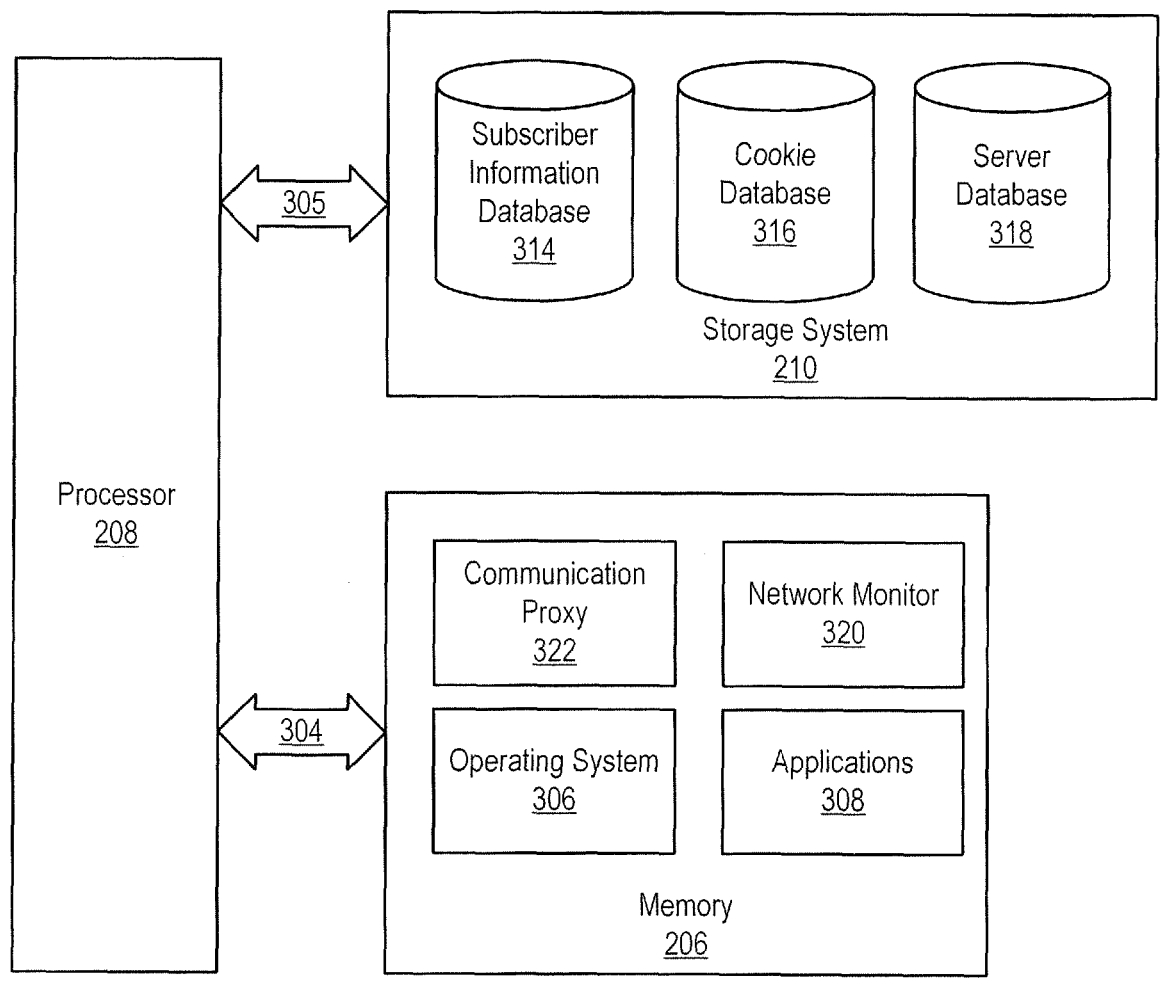
FIG. 3 is a block diagram that illustrates a software architecture for a system for enhancing network security for subscribers in accordance with some embodiments.

FIG. 3 illustrates a processor 208, a memory 206 and a storage system 210 that may be used in embodiments of methods, systems, and computer program products for enhancing network security in accordance with some embodiments. The processor 208 communicates with the memory 206 via an address/data bus 304. The processor 208 may be, for example, a commercially available or custom microprocessor. The memory 206 is representative of the overall hierarchy of memory devices containing the software and data used to discreetly monitor a communications network for private and/or sensitive information in accordance with some embodiments. The memory 206 may include, but is not limited to, the following types of devices: cache, ROM, PROM, EPROM, EEPROM, flash, SRAM, and DRAM.

As shown in FIG. 3, the memory 206 may include several categories of software and data: an operating system 306, and application programs 308. The operating system 306 controls the operation of the data processing system. In particular, the operating system 306 may manage the data processing system's resources and may coordinate execution of programs by the processor 208. The operating system 306 can include I/O device drivers accessed by the application programs 308 to communicate with devices such as the I/O data port(s) 214 of FIG. 2 and other components of the memory 206. The application programs 308 include programs that implement the various features of a data processing system according to embodiments, and may include at least one application which supports operations for enhancing the security of network communications according to some embodiments. Finally, the data stored in the data storage system 210 represents the static and dynamic data used by the application programs 308, the operating system 306, and other software programs that may reside in the memory 206.

As is further seen in FIG. 3, the data storage system 210 may include one or more databases which contain data used in the operation of the connection server 120. In particular, the data 312 may include a subscriber information database 314, a cookie database 316, and a server database 318. The processor 208 communicates with the data storage system 210 via an address/data bus 305. The subscriber information database 314 may include configuration information associated with each subscriber of the network service, such as subscriber preference and configuration information, subscriber authentication and billing information, etc. The cookie database 316 may include cookie information stored by the connection server 120 on behalf of subscribers. The server database 318 may include information relative to remote servers that are or may be accessed by subscribers to the network service. Although exemplary embodiments are illustrated with reference to multiple separate databases in FIG. 3, it will be appreciated by those of skill in the art that the subscriber information, the cookie information, and the server information may be stored within a single database. Furthermore, it will be appreciated that the subscriber information, the cookie information, and the server information may be stored in many different types of storage units, including an online storage, an offline storage, an electronic memory, such as a RAM, a direct access storage device, such as a disk, or any other suitable storage device.

Still referring to FIG. 3, the application programs 308 may include a network monitor 320 and a communication proxy 322. The communication proxy 322 may monitor and maintain sessions between a subscriber terminal 110a, 110b, 110c and a remote server 140, 150. In particular, the communication proxy 322 may monitor communications to/from the subscriber terminals 110a, 110b, 110c, and may manage the storage and use of cookies on behalf of the subscriber terminals 110a, 110b, 110c, in order to provide enhanced security for the subscriber terminals 110a, 110b, 110c, as discussed below. The network monitor 320 may monitor and aggregate information about remote servers 140, 150 and use such information to identify potential security threats to the subscriber terminals 110a, 110b, 110c.

Although FIG. 3 illustrates an exemplary software/data architecture that may facilitate enhancing network security for subscribers, it will be understood that the present invention is not limited to such a configuration but is intended to encompass any configuration capable of carrying out the operations described herein. For example, while exemplary embodiments are described with reference to the network monitor 320 and communication proxy 322 as application programs 308, other configurations may also be utilized. For instance, the network monitor 320 and communication proxy 322 may also be incorporated into the operating system 306.

Referring to FIGS. 1-3, a network communication system according to some embodiments includes a first interface 115a-c configured to establish a communication path with a subscriber terminal 110a-c, a second interface 125 configured to establish a communication path with a network access point 135 that is connected to a data communication network 115, and a connection server 120 that is configured to assign a network address within the data communication network 115 to the subscriber terminal 110a-c.

The connection server 120 is configured to receive outgoing communications from the subscriber terminal 110a-c and to transmit the outgoing communications to the network access point 135, and to receive incoming communications from the network access point 135 and transmit the incoming communications to the subscriber terminal 110a-c to which such communications are addressed using the network address assigned to the subscriber terminal 110a-c. The connection server 120 is further configured to intercept a tracking cookie received from a remote server, such as an application server 140 or a web server 150, in the data communications network 115 and intended for the subscriber terminal 110a-c, and to store the tracking cookie in the cookie database 316. The tracking cookie can then be used to support a communication session between the subscriber terminal 110a-c and the remote server 140, 150 without the tracking cookie being stored at the subscriber terminal 110a-c.

The tracking cookie is not stored at the subscriber terminal 110a-c, and thus cannot be used for long-term tracking and identification of the user. Furthermore, the connection server 120 may be configured to delete the tracking cookie after a predetermined period of time. For example, the connection server 120 may be configured to delete the tracking cookie after it has been stored for one day, one week, etc. In some embodiments, the connection server 120 may be configured to delete the tracking cookie if the subscriber terminal 110a-c for which the cookie is stored does not access the server 140, 150 that placed the cookie within a predetermined period of time.

By storing the tracking cookie, the cookie can be used to support an ongoing connection between the subscriber terminal 110a-c and the remote server 140, 150. For example, if a user of the subscriber terminal 110a-c is shopping at a virtual store operated by the server 140, 150, the tracking cookie can be used to keep track of login or identification information provided by the user, to keep track of items in the user's cart, or for other purposes. Thus, when the server 140, 150 issues a request to the subscriber terminal 110a-c for the tracking cookie, the connection server 120 intercepts the request from the server 140, 150 and provides the cookie to the server 140, 150. However, as the cookie is not stored on the subscriber terminal 110a-c, the cookie cannot be used for tracking the user's behavior after the session has ended.

The connection server 120 may be configured to reject cookies that originate from servers ("third party servers") other than the server originally accessed by the subscriber terminal 110a-c. Such cookies may therefore not be stored by the connection server 120 or forwarded to the subscriber terminal 110a-c.

In some cases, the connection server 120 may be configured to release the network address assigned to the subscriber terminal 110a-c upon the occurrence of a predetermined event. For example, some NSPs 130 use a system in which network addresses are "leased" to users for a defined period of time. When the lease has expired the network address may be released by the NSP 130 and can be re-assigned to a different user. The connection server 120 may be configured to delete all tracking cookies associated with a particular subscriber terminal 110a-c in response to the release of the network address assigned to the subscriber terminal 110a-c.

In some embodiments, the connection server 120 may be configured to save the tracking cookie in response to the release of the network address assigned to the subscriber terminal 110a-c for later use by the subscriber terminal 110a-c when a new network address is assigned to the subscriber terminal 110a-c. Thus, a subscriber can disconnect from the NSP 130 and reconnect at a later time and resume communications with a remote server 140, 150 using a cookie stored by the connection server 120.

The connection server 120 may be configured to intercept a request for the stored tracking cookie from the remote server 140, 150 and to provide the stored tracking cookie to the remote server 140, 150 in response to the request. The remote server 140, 150 can use the tracking cookie to support the ongoing connection with the subscriber terminal 110a-c. In some embodiments, the connection server 120 can insert a stored cookie into an outgoing communication from a subscriber terminal 110a-c addressed to a remote server 140, 150 from which the connection server 120 has received and stored a cookie on behalf of the subscriber terminal 110a-c.

Storing cookies at a connection server 120 managed by a subscriber's NSP 130 and used by a subscriber terminal 110a-c to access the communications network 115 may have particular benefits for the subscriber. For example, cookies may be stored at the connection server 120 and inserted seamlessly and quickly into outgoing communications from the subscriber terminal 110a-c. This also reduces network load on the communication link 112. Note also that such cookies do not have to be retrieved from elsewhere in the network 115. In contrast, if the cookies were stored for a user at a cookie server that is accessed through the communications network 115, then every communication of the subscriber terminal to the desired server 140, 150 would have to be routed through the communications network 115 to the cookie server, potentially dramatically slowing down the session and decreasing the usability of the service provided by the server 140, 150.

When a tracking cookie is intercepted by the connection server 120, the connection server 120 may provide a notice to the subscriber terminal 110a-c of the receipt and storage of the tracking cookie. The connection server 120 may then transmit the tracking cookie to the subscriber terminal 110a-c upon request. For example, a user may determine that it is desirable to store a particular tracking cookie locally at the subscriber terminal 110a-c so that the cookie can be used to support subsequent communication sessions.

In addition to storing and managing tracking cookies on behalf of a subscriber terminal 110a-c, the connection server 120 may be further configured to hide the actual network address of a subscriber terminal 110a-c from a remote server 140, 150. The connection server 120 may accomplish this by replacing the network address of the subscriber terminal 110a-c in the outgoing communication with an alias network address. When a response to the communication is received from the remote server 140, 150, the connection server 120 determines that the response is directed to the alias address, and directs the communication to the subscriber terminal that originated the outgoing communication.

The connection server 120 may further be configured to inspect an outgoing communication of the subscriber terminal 110a-c to determine an identity of the remote server 140, 150 to which the outgoing communication is addressed and, in response to determining the identity of the remote server 140, 150, to query the subscriber terminal 110a-c to determine if the connection server 120 should intercept cookies from the remote server 140, 150 and/or use an alias address for communications with the remote server 140, 150.

Because an NSP 130 provides network access to a large number of subscribers, a system according to some embodiments can monitor the communications behavior of a large number of subscriber terminals 110a-c, and by observing trends and actions of a large number of subscriber terminals and remote servers 140, 150, can potentially determine that a remote server 140, 150 is associated with malicious use of tracking cookies and/or with identity theft. For example, the NSP 130 can keep statistics on the number of times third party cookies are received by subscriber terminals 110a-c in response to users accessing a particular remote server. In other embodiments, the connection server 120 can be configured to always intercept or block cookies from particular sites that are known to be associated with malicious use of tracking cookies and/or identity theft. Information about the behavior of remote servers can be aggregated and stored in the server database 318 (FIG. 3). In addition, network intelligence data accumulated over time and implemented via standard machine learning techniques may be used to monitor and track traffic within connection server 120 to selectively block or allow incoming or outgoing traffic, while keeping the true identity of the subscriber and/or terminal device hidden from application server 140 or web server 150. For example, a zero-day malicious attack scheme could be detected in aggregate early enough to protect the majority of subscriber terminals 110. Keeping subscriber information hidden from the remote servers enhances security by preventing tracking users by these remote servers.

The connection server 120 may be configured to intercept third party cookies originating from servers other than the remote server 140, 150 and addressed to the subscriber terminal 110a-c.

Embodiments may take the form of an entirely hardware embodiment, an entirely software embodiment or an embodiment combining software and hardware aspects. Computer program code for carrying out operations of systems described above with respect to FIGS. 1 to 3 may be written in a high-level programming language, such as C or C++, for development convenience. In addition, computer program code for carrying out operations of embodiments may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

According to some embodiments, systems, methods and/or computer program products may be provided that can automatically and continuously search a network, such as the Internet, as well as other network-accessible databases, for private and/or sensitive information. The searches can be conducted in a manner that may obscure the private and/or sensitive information that is the true target of the searches.

Figure 4:
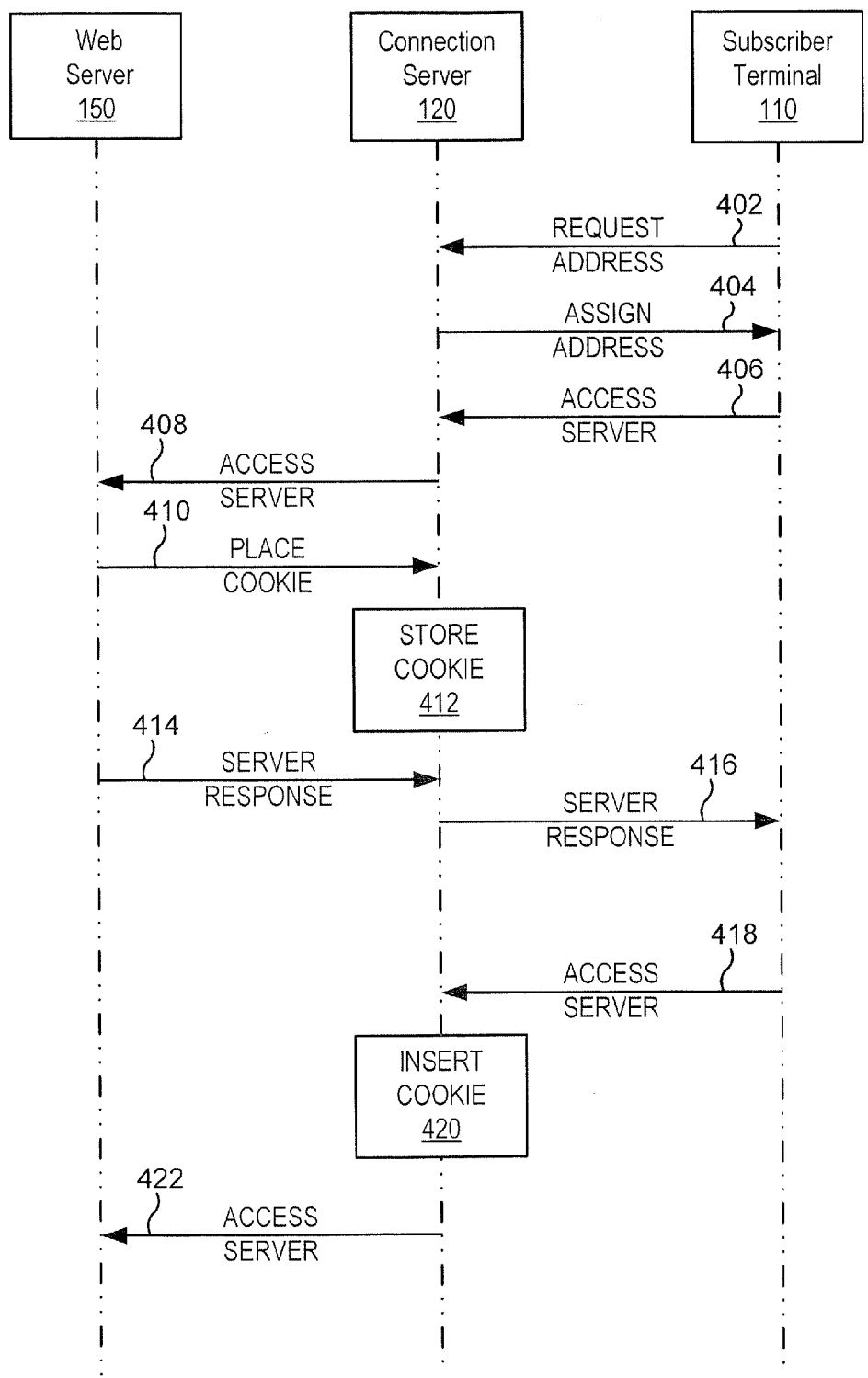
FIGS. 4 and 5 illustrate operations for enhancing network security for subscribers in accordance with some embodiments.

Exemplary operations for enhancing network security in accordance with some embodiments will now be described with reference to the flowcharts of FIGS. 4 and 5. Referring now to FIGS. 1-4, a subscriber terminal 110 connects to the connection server 120 through an interface 115a-c and requests a network address (Message 402). The connection server 120 may authenticate the subscriber terminal 110 by checking subscriber information in the subscriber information database 314, and in response to authenticating the subscriber terminal 110, assigns a network address to the subscriber terminal 110 (Message 404).

The subscriber terminal 110 then attempts to access a remote server, such as the web server 150 (Message 406). The access request is received by the connection server 120 and forwarded through the data communications network 115 to the remote server 150 (Message 408). The connection 120 server may replace the network address of the subscriber terminal 110 with an alias address, as discussed above.

In response to receiving the access request, the remote web server 150 may attempt to set, or place, a cookie at the subscriber terminal 110 (Message 410). The connection server 120 may intercept the cookie and store the cookie in the cookie database 316 (Block 412). The connection server 120 may notify the subscriber terminal 110 that the cookie has been stored, and may inform the subscriber terminal of how long the cookie will be stored by the connection server 120. In some embodiments, the subscriber (or user of a subscriber terminal) may be permitted to specify how long the cookie will be stored and/or may request that the cookie be forwarded to the subscriber terminal 110.

The web server 150 then provides a response to the subscriber terminal 110 (Message 414), which is forwarded by the connection server 120 to the subscriber terminal 110, with alias address translation, if necessary (Message 416). It will be appreciated that the cookie may be contained within the server response 414, in which case the connection server 120 may strip the cookie out of the server response and may replace the cookie with dummy data before forwarding the response to the subscriber terminal 110.

At a later point in the session, the subscriber terminal 110 may send another access request to the web server 150 (Message 418). Upon receiving the request, the connection server 120 checks the destination of the request and determines that it has stored a cookie associated with the domain of the remote web server 150. The connection server 120 then retrieves the stored cookie from the cookie database 316 and inserts/appends the stored cookie to the request (Block 420). The request, including the cookie, is then forwarded by the connection server 120 to the remote web server 150, with alias address translation if desired (Message 422). Thus, the remote web server 150 can associate the request with a previous or existing connection with the subscriber terminal 110.

Figure 5:
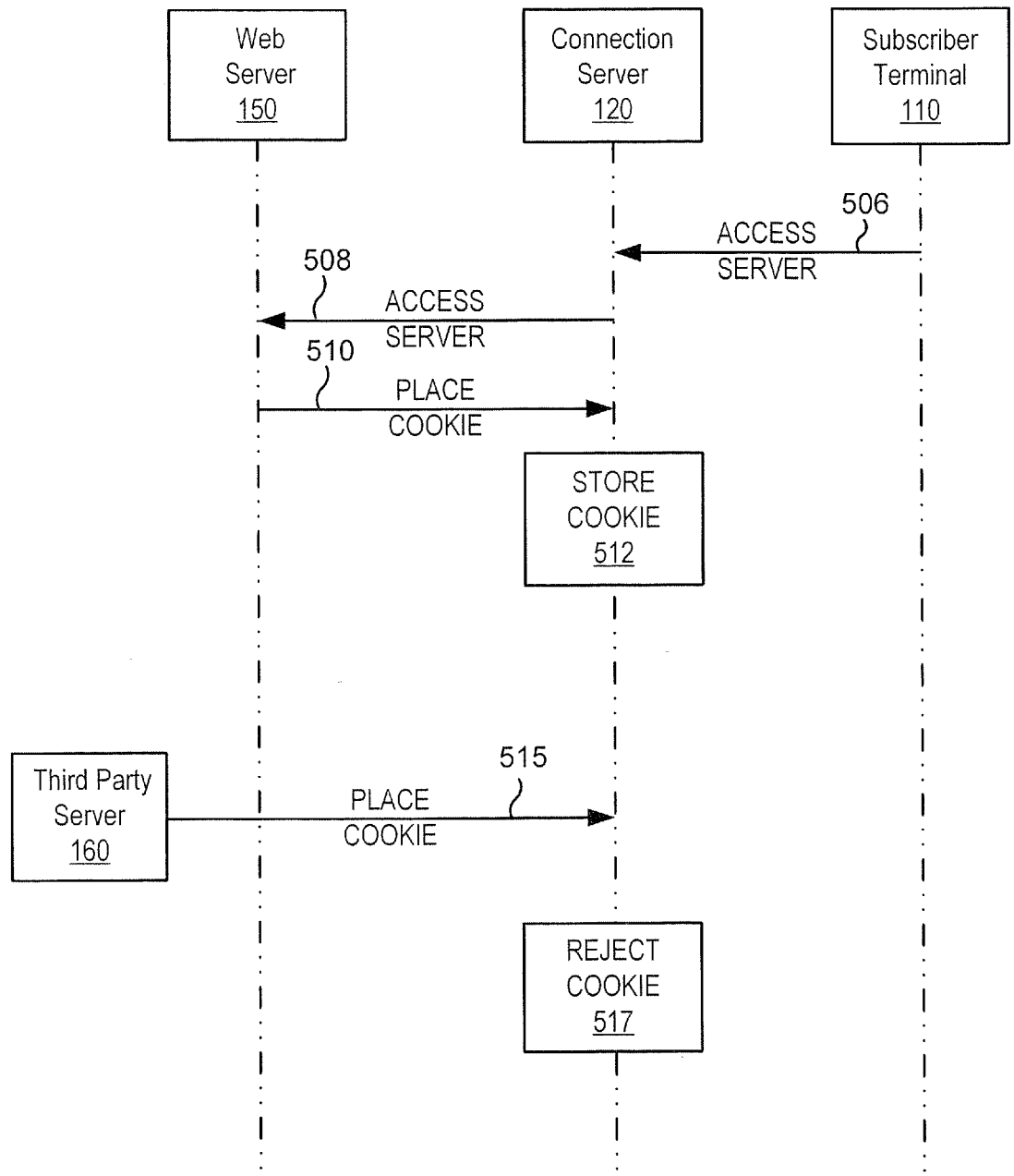

Further embodiments are illustrated in FIG. 5. As shown therein, the subscriber terminal 110 may attempts to access a remote server, such as the web server 150 (Message 506). The access request is received by the connection server 120 and forwarded through the data communications network 115 to the remote web server 150 (Message 508). The connection server 120 may replace the network address of the subscriber terminal 110 with an alias address, as discussed above.

In response to receiving the access request, the remote web server 150 may attempt to set, or place, a cookie at the subscriber terminal 110 (Message 510). The connection server 120 may intercept the cookie and store the cookie in the cookie database 316 (Block 512). A third party server 160 may then attempt to set or place a third party cookie at the subscriber terminal 110 (Message 515). However, because the cookie is not being placed by the web server 150 that the subscriber terminal 110 originally accessed, the connection server 120 may reject the cookie (Block 517).

Although the FIGS. 4 and 5 and the accompanying description refer to the web server 150 as the remote web server, it should be appreciated that operations for enhancing network security in accordance with exemplary embodiments may be performed using other remote servers, such as the application server 140.

As described herein, systems and/or methods of enhancing the security and/or privacy of network communications for subscribers to a network service are provided by a connection server 120 that provides access to a data communications network 115 as well as stores and manages cookies on behalf of a subscriber terminal 110. A subscriber terminal 110 can thereby access a remote server 140, 150 quickly and seamlessly without having a cookie from the server 140, 150 stored at the subscriber terminal 110. Furthermore, the connection server 120 can provide address translation for communications with the remote server 140, 150, further enhancing the security and/or privacy of the communication.

Exemplary embodiments may take the form of systems, methods, and/or computer program products. Accordingly, exemplary embodiments may be embodied in hardware and/or in software (including firmware, resident software, microcode, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable storage medium may be any tangible medium that can store the program for use by or in connection with the instruction execution system, apparatus, or device.

Figure 6:
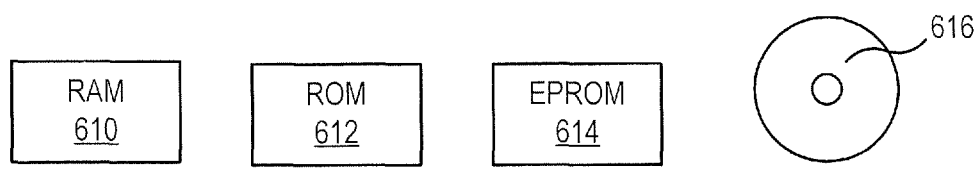
FIG. 6 illustrates various types of computer readable storage media on which some embodiments can be stored.

The computer-usable or computer-readable medium may be, for example but not limited to, an electronic, magnetic, optical, electromagnetic, or semiconductor system, apparatus, or device. For example, as illustrated in FIG. 6, the computer-readable storage medium may include a random access memory (RAM) 610, a read-only memory (ROM) 612, an erasable programmable read-only memory (EPROM or Flash memory) 614, and/or an optical storage disk 616, such as a CD-ROM, DVD-ROM or DVD-RAM.

Exemplary embodiments are described herein with reference to flowchart and/or block diagram illustrations of methods, systems, and computer program products. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Many variations and modifications can be made to the embodiments described herein without substantially departing from the principles of the present invention. All such variations and modifications are intended to be included herein within the scope of the present invention, as set forth in the following claims.

That which is claimed is:

1. A network communication system, comprising:
   a processor in communication with a memory with instructions stored in said memory executed by said processor;
   a first interface establishing a communication path with a subscriber terminal;
   a second interface establishing a communication path with a network access point that is connected to a data communication network; and
   a connection server assigning a network address within the data communication network to the subscriber terminal;
   wherein the connection server receives outgoing communications from the subscriber terminal and transmits the outgoing communications to the network access point and receives incoming communications from the network access point and transmits the incoming communications to the subscriber terminal;
   wherein the connection server further intercepts a tracking cookie received from a first remote server in the data communications network and intended for the subscriber terminal and stores the tracking cookie at the connection server so that the tracking cookie can be used to support a communication session between the subscriber terminal and the first remote server without the tracking cookie being stored at the subscriber terminal; and
   wherein the connection server further inspects an outgoing communication of the subscriber terminal to determine an identity of a second remote server to which the outgoing communication is addressed and, in response to determining the identity of the second remote server from the outgoing communication of the subscriber terminal, queries the subscriber terminal to determine if the connection server should intercept tracking cookies from the second remote server that have not yet been received by the connection server.

2. The network communication system of claim 1, wherein the connection server further deletes the tracking cookie after a predetermined period of time.

3. The network communication system of claim 1, wherein the connection server further releases the network address assigned to the subscriber terminal upon the occurrence of a predetermined event, and deletes the tracking cookie in response to the release of the network address assigned to the subscriber terminal.

4. The network communication system of claim 1, wherein the connection server further releases the network address assigned to the subscriber terminal upon the occurrence of a predetermined event, and saves the tracking cookie in response to the release of the network address assigned to the subscriber terminal for later use by the subscriber terminal when a new network address is assigned to the subscriber terminal.

5. The network communication system of claim 1, wherein the connection server further intercepts a request for the tracking cookie from the first remote server and provides the tracking cookie to the first remote server in response to the request.

6. The network communication system of claim 1, wherein the connection server further replaces the network address of the subscriber terminal in the outgoing communication with an alias network address.

7. The network communication system of claim 1, wherein the connection server further determines that the second remote server is associated with malicious use of tracking cookies.

8. The network communication system of claim 1, wherein the connection server further intercepts and rejects third party cookies originating from servers other than the first remote server and addressed to the subscriber terminal.

9. The network communication system of claim 1, wherein the connection server receives an outgoing communication from the subscriber terminal, determines that the outgoing communication is addressed to the first remote server, inserts the tracking cookie into the outgoing communication, and forwards the outgoing communication to the first remote server.

10. A method of providing network communication services, comprising:
    assigning a network address within a data communication network to a subscriber terminal;
    intercepting a tracking cookie received from a first remote server in the data communications network and intended for the subscriber terminal;
    storing the tracking cookie so that the tracking cookie can be used to support a communication session between the subscriber terminal and the first remote server without the tracking cookie being stored at the subscriber terminal; and
    inspecting an outgoing communication of the subscriber terminal to determine from the outgoing communication of the subscriber terminal an identity of a second remote server to which the outgoing communication is addressed and, in response to determining the identity of the second remote server, querying the subscriber terminal to determine if tracking cookies from the second remote server that have not yet been received should be intercepted.

11. The method of claim 10, further comprising:
    deleting the tracking cookie after a predetermined period of time.

12. The method of claim 10, further comprising:
    releasing the network address assigned to the subscriber terminal upon the occurrence of a predetermined event; and
    deleting the tracking cookie in response to the release of the network address assigned to the subscriber terminal.

13. The method of claim 10, further comprising:
    releasing the network address assigned to the subscriber terminal upon the occurrence of a predetermined event, and
    saving the tracking cookie in response to the release of the network address assigned to the subscriber terminal for later use by the subscriber terminal when a new network address is assigned to the subscriber terminal.

14. The method of claim 10, further comprising:
intercepting a request for the stored tracking cookie from the first remote server; and
providing the stored tracking cookie to the first remote server in response to the request.

15. The method of claim 10, further comprising:
receiving a second outgoing communication from the subscriber terminal;
determining that the outgoing communication is addressed to the first remote server;
inserting the tracking cookie into the outgoing communication; and
forwarding the outgoing communication to the first remote server.

16. A computer program product for providing network communication services, the computer program product comprising:
a non-transitory computer readable storage medium having computer readable program code embodied in the medium, the computer readable program code when executed by a processor causes the processor to perform a method comprising:
assigning a network address within a data communication network to the subscriber terminal;
intercepting a tracking cookie received from a first remote server in the data communications network and intended for the subscriber terminal;
storing the tracking cookie so that the tracking cookie can be used to support a communication session between the subscriber terminal and the first remote server without the tracking cookie being stored at the subscriber terminal;
providing a notice to the subscriber terminal of the receipt and storage of the tracking cookie; and
inspecting an outgoing communication of the subscriber terminal to determine from the outgoing communication of the subscriber terminal an identity of a second remote server to which the outgoing communication is addressed and, in response to determining the identity of the second remote server, to query the subscriber terminal to determine if tracking cookies from the second remote server that have not yet been received should be intercepted.

17. The computer program product of claim 16, the method further comprising:
intercepting a request for the stored tracking cookie from the first remote server;
providing the stored tracking cookie to the first remote server in response to the request.

18. The computer program product of claim 16, the method further comprising:
receiving a second outgoing communication from the subscriber terminal;
determining that the second outgoing communication is addressed to the first remote server;
inserting the tracking cookie into the outgoing communication; and
forwarding the outgoing communication to the first remote server.

* * * * *